(12) United States Patent
Goja

(10) Patent No.: US 10,824,984 B2
(45) Date of Patent: *Nov. 3, 2020

(54) DROP BOX ITEM DEPOSIT SENSOR SYSTEM AND METHODS OF USING THE SAME

(71) Applicant: United Parcel Service of America, Inc., Atlanta, GA (US)

(72) Inventor: Asheesh Goja, Upper Saddle River, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,747

(22) Filed: Jun. 6, 2019

(65) Prior Publication Data

US 2019/0287061 A1    Sep. 19, 2019

Related U.S. Application Data

(63) Continuation of application No. 15/867,905, filed on Jan. 11, 2018, now Pat. No. 10,373,100.

(Continued)

(51) Int. Cl.
*A47G 29/20* (2006.01)
*G06Q 10/08* (2012.01)
(Continued)

(52) U.S. Cl.
CPC ..... *G06Q 10/0833* (2013.01); *A47G 29/1225* (2013.01); *A47G 29/141* (2013.01);
(Continued)

(58) Field of Classification Search
CPC ...... A47G 2029/1226; A47G 2029/145; A47G 2029/148; A47G 2029/149;
(Continued)

(56) References Cited

U.S. PATENT DOCUMENTS 5,818,336 A    10/1998  Varga et al.
7,341,186 B2    3/2008  Mrozik et al.
(Continued)

FOREIGN PATENT DOCUMENTS

WO    2008/113568 A1    9/2008

OTHER PUBLICATIONS

International Search Report and Written Opinion received for PCT Patent Application No. PCT/US2018/013334, dated Apr. 6, 2018, 13 pages.

(Continued)

*Primary Examiner* — Daniel Previl
(74) *Attorney, Agent, or Firm* — Shook, Hardy & Bacon L.L.P.

(57) ABSTRACT

An item drop box sensor system for detecting items deposited within a drop box may be configured to detect movement of an item deposit tray and to detect items deposited within the drop box. The drop box sensor system may comprise one or more tray movement sensors for detecting movement of the deposit tray, one or more item detection sensors configured to detect items passing into the drop box via the deposit tray, and an onboard controller for selectively activating the various sensors to conserve power and for transmitting data indicative of the status of the drop box to a central server configured for scheduling item pickups for various geographically spaced drop boxes.

20 Claims, 6 Drawing Sheets

Related U.S. Application Data

(60) Provisional application No. 62/445,294, filed on Jan. 12, 2017.

(51) Int. Cl.
  *G07D 11/00* (2019.01)
  *A47G 29/122* (2006.01)
  *G06Q 50/28* (2012.01)
  *A47G 29/30* (2006.01)
  *A47G 29/14* (2006.01)
  *G07C 9/00* (2020.01)

(52) U.S. Cl.
  CPC ............ *A47G 29/30* (2013.01); *G06Q 50/28* (2013.01); *G07C 9/00896* (2013.01); *G07D 11/0093* (2013.01); *A47G 2029/1226* (2013.01); *A47G 2029/145* (2013.01); *A47G 2029/148* (2013.01); *A47G 2029/149* (2013.01)

(58) Field of Classification Search
  CPC .. A47G 29/1225; A47G 29/141; A47G 29/30; G06Q 10/0833; G06Q 50/28; G06Q 10/08; G06Q 20/10; G06Q 20/102; G06Q 20/405; G06Q 40/12; G06Q 20/042; G07C 9/00896; G07C 9/00309; G07C 9/00134; G07C 9/00166; G07D 11/0093; G08B 13/08; G08B 13/1481; G08B 13/2402; Y10S 209/90; B07C 3/00; B07C 1/00; B64F 1/366; G01V 11/00; G06K 17/0022; B43M 7/02
  USPC ...... 340/569, 539.1, 539.14, 539.16, 539.17, 340/545.6
  See application file for complete search history.

(56) References Cited

U.S. PATENT DOCUMENTS

| | | | |
|---|---|---|---|
| 7,506,796 B1* | 3/2009 | Hanna | A47G 29/1214 200/61.52 |
| 7,786,862 B1* | 8/2010 | Campbell | A47G 29/1214 340/539.1 |
| 9,082,099 B1 | 7/2015 | Kolchin | |
| 9,371,681 B2* | 6/2016 | Tompkins | E05G 1/02 |
| 10,373,100 B2* | 8/2019 | Goja | G07C 9/00896 |
| 2003/0136823 A1 | 7/2003 | Felice et al. | |
| 2005/0057354 A1* | 3/2005 | Jenkins | G01V 11/00 340/522 |
| 2005/0113166 A1 | 5/2005 | Grauzer et al. | |
| 2005/0154602 A1* | 7/2005 | Hertz | G06Q 10/08 345/540 |
| 2008/0067227 A1 | 3/2008 | Poss et al. | |
| 2008/0278323 A1* | 11/2008 | Jackson | G08B 13/2414 340/569 |
| 2009/0028678 A1 | 1/2009 | Kutzer | |
| 2010/0001861 A1 | 1/2010 | Davis | |
| 2011/0210166 A1 | 9/2011 | Dinh | |
| 2013/0020384 A1 | 1/2013 | Corey | |
| 2016/0316322 A1 | 10/2016 | Gillen | |
| 2018/0046978 A1 | 2/2018 | Tartal et al. | |
| 2018/0197140 A1 | 7/2018 | Goja | |

OTHER PUBLICATIONS

Non-Final Office Action received for U.S. Appl. No. 15/867,905, dated Oct. 2, 2018, 9 pages.
Notice of Allowance received for U.S. Appl. No. 15/867,905, dated Mar. 21, 2019, 8 Pages.

* cited by examiner

DROP BOX ITEM DEPOSIT SENSOR SYSTEM AND METHODS OF USING THE SAME

CROSS-REFERENCE TO RELATED APPLICATIONS

This patent application is a Continuation of Non-Provisional application Ser. No. 15/867,905, filed Jan. 11, 2018, titled "Drop Box Item Deposit Sensor System And Methods Of Using The Same", which claims priority to Provisional Application Ser. No. 62/445,294, filed Jan. 12, 2017 which are incorporated herein by reference in their entirety.

BACKGROUND

Drop boxes and other item holding containers have historically been utilized as convenient mechanisms for holding a plurality of items destined for a common location (e.g., an intermediate shipping location, a single video rental store, and/or the like). These drop boxes are often embodied as closed boxes with lockable access panels accessible only by authorized personnel used to remove items from the interior of the drop box. The drop boxes also may include drop box trays that enable items (e.g., packages/parcels) to be placed within the drop box without enabling items to be withdrawn therethrough.

Traditional drop boxes have generally proven to be effective at compiling items for collection by a single entity (e.g., a single parcel carrier) by a plurality of disparate consignees while simultaneously preventing access to those items by unauthorized individuals. Retrieving items from these drop boxes is often a highly manual and time consuming process however, and therefore drop boxes are generally useful as time-saving mechanisms for the retrieving entity (e.g., carrier) only when a plurality of items may be retrieved from the drop box simultaneously. Unfortunately, entity personnel are required to approach and open many drop boxes in order to determine whether there are any items positioned therein. Thus, entity personnel are only able to determine whether the drop box provided any time-savings for the entity only after expending a non-negligible amount of time opening the drop box.

Thus, a need exists for mechanisms for monitoring the usage of item drop boxes without requiring substantial time-investments by entity personnel to retrieve items therefrom.

BRIEF SUMMARY

Various embodiments are directed to item drop boxes and sensor systems configured for integration with item drop boxes. The sensor systems are configured to detect items deposited into a connected drop box via a plurality of sensors that work collectively to conserve power and to accurately monitor whether items have been deposited in the drop box. In certain embodiments, the sensor systems comprise a drop box tray sensor configured to monitor (1) whether the drop box tray has been opened, and/or (2) the angular position of the drop box tray to detect if/when an item on the tray will slide into the interior of the drop box. The sensor systems may also comprise an infrared or other optical sensor system (e.g., light curtain sensor, time-of-flight sensor, and/or the like) configured to detect items sliding off of the tray and into the interior of the drop box. The optical sensor system may be configured to be activated only after a trigger event (e.g., detecting movement of the drop box tray) to minimize power consumption by the sensor system. The sensor system may be further configured to transmit signals indicative of the contents of the drop box to a central server, and that central server may be configured to generate and/or modify alerts to be sent to various mobile devices to instruct personnel to retrieve items from various drop boxes.

Certain embodiments are directed to an item drop box comprising: a housing configured to receive one or more items; a movable deposit tray for placing items in the housing; and a sensor system. The sensor system may comprise: one or more tray movement sensors configured to detect movement of the movable deposit tray; one or more item detection sensors configured to detect items deposited in the housing; and an onboard controller comprising at least one non-transitory memory storage medium, one or more processors, and one or more wireless transmitters. In certain embodiments, the onboard controller is configured to: monitor, via the one or more processors, signals generated by the one or more tray movement sensors; upon detecting movement of the movable deposit tray, activate, via the one or more processors, the one or more item detection sensors; generate, via the one or more processors, status data for the drop box, wherein the status data identifies a status of the sensor system; and transmit, via the one or more wireless transmitters, the status data to one or more external computing entities.

In certain embodiments, the one or more tray movement sensors comprises a proximity sensor configured to determine whether the movable deposit tray is in a closed position or an open position. Moreover, the one or more tray movement sensors may comprise an accelerometer configured to detect an angle of rotation of the movable deposit tray. In certain embodiments, the onboard controller is further configured to: monitor signals generated by the proximity sensor; upon detecting that the movable deposit tray has moved from the closed position to the open position, activate the accelerometer to detect the angle of rotation of the movable deposit tray; and upon detecting that the movable deposit tray has moved to a trigger angular position, activate the one or more item detection sensors.

In certain embodiments, the one or more tray movement sensors comprises an accelerometer configured to detect an angle of rotation of the movable deposit tray. Moreover, the one or more item detection sensors may comprise an optical sensor (e.g., light curtain sensor, time-of-flight sensor, and/or the like).

In certain embodiments, activating the one or more item detection sensors comprises activating the one or more item detection sensors for a predefined period of time. Moreover, the status data may identify whether an item is present within the housing.

Certain embodiments are directed to an item drop box sensor system comprising: one or more tray movement sensors configured to detect movement of a drop box deposit tray and to generate a movement signal upon detection of movement of the drop box deposit tray; one or more item detection sensors configured to detect items deposited in a drop box housing; and an onboard controller comprising at least one non-transitory memory storage medium, one or more processors, and one or more wireless transmitters. In certain embodiments, the onboard controller is configured to: monitor, via the one or more processors, signals generated by the one or more tray movement sensors; upon receipt of a movement signal from the one or more tray movement sensors, activate, via the one or more processors, the one or more item detection sensors; generate, via the one or more processors, status data, wherein the status data identifies a status of the sensor system; and transmit, via the one or more wireless transmitters, the status data to one or more external computing entities.

In certain embodiments, the one or more tray movement sensors comprises a proximity sensor configured to determine whether the drop box deposit tray is in a closed position or an open position. Moreover, the proximity sensor may be a magnetic proximity sensor (e.g., a passive magnetic proximity sensor, such as a reed switch). In certain embodiments, the one or more tray movement sensors comprises an accelerometer configured to detect an angle of rotation of the movable deposit tray. Moreover, the onboard controller is further configured to: monitor signals generated by the proximity sensor; upon detecting that the drop box deposit tray has moved from the closed position to the open position, activate the accelerometer to detect the angle of rotation of the drop box deposit tray; and upon detecting that the drop box deposit tray has moved to a trigger angular position, activate the one or more item detection sensors. In certain embodiments, the one or more tray movement sensors comprises an accelerometer configured to detect an angle of rotation of the movable deposit tray. Moreover, the item drop box sensor may comprise an onboard power source, and/or the one or more item detection sensors may comprise an optical sensor (e.g., a light curtain sensor, a time-of-flight sensor, and/or the like). In certain embodiments, activating the one or more item detection sensors comprises activating the one or more item detection sensors for a predefined period of time.

Certain embodiments are directed to a drop box network monitoring system comprising: a central server; and a plurality of geographically spaced item drop boxes. In certain embodiments, each item drop box comprises an item sensor system configured to detect one or more items deposited within a respective drop box; and an onboard controller comprising at least one non-transitory memory storage medium, one or more processors, and one or more wireless transmitters. The onboard controller may be configured to: generate drop box status data indicative of a status of the item sensor system; and transmit the drop box status data to the central server. Moreover, the central server may be configured to: receive drop box status data from a plurality of drop boxes; and based at least in part on the drop box status data, generate one or more alerts identifying one or more drop boxes containing items.

In various embodiments, the central server is further configured to transmit the one or more alerts to one or more mobile computing entities. Moreover, in certain embodiments, the drop box status data identifies at least one of: a number of times items were deposited into an item drop box; a power supply level for the item sensor system; a status of one or more sensors of the item sensor system; or a wireless transmitter status of the onboard controller.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DESCRIPTION

Figure 1:
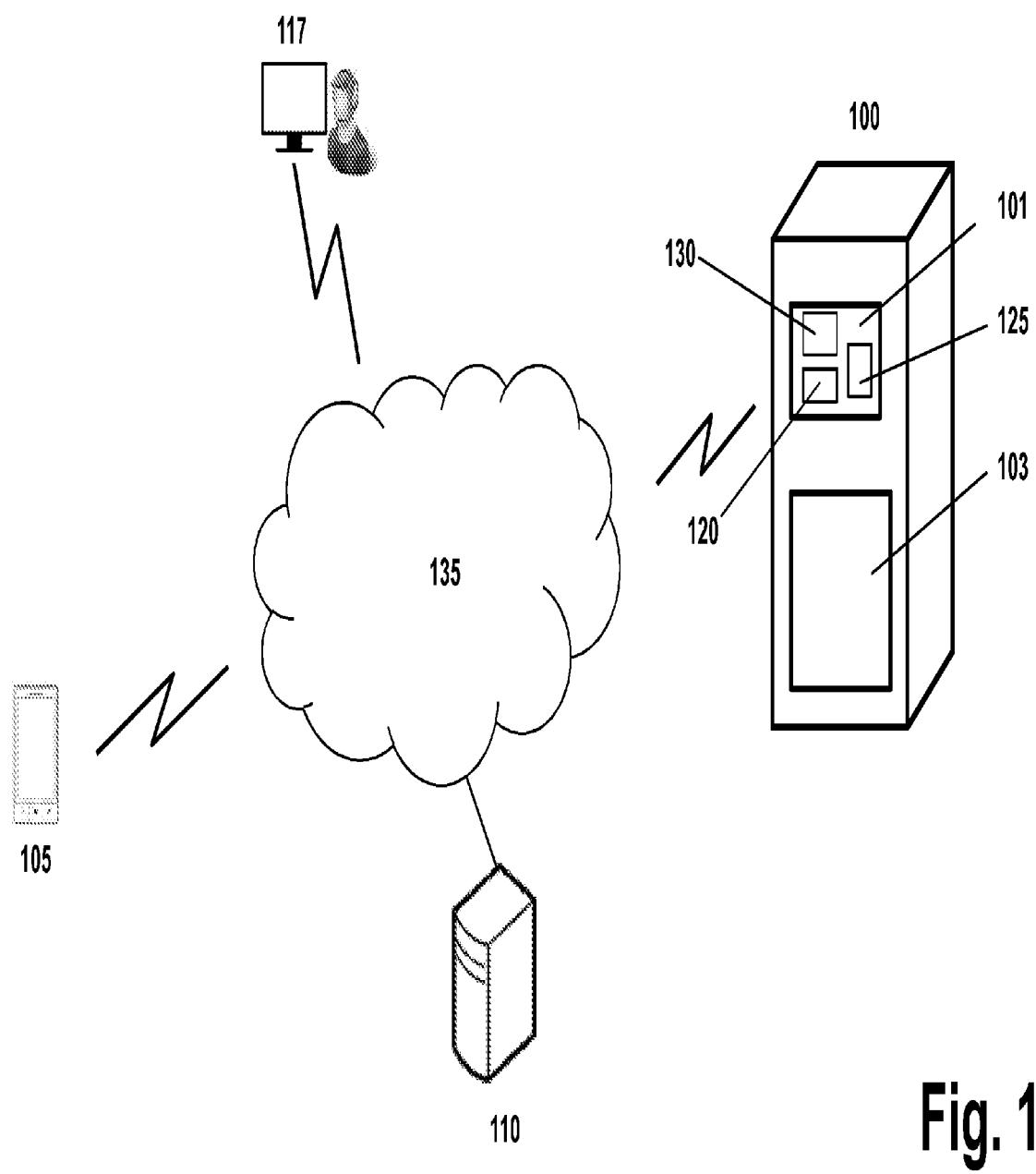
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more drop boxes 100, one or more Internet of Things (IoT) computing entities 130, one or more items 109 (not shown), one or more mobile computing entities 105, one or more management computing entities 110, one or more dispatcher computing entities 117, one or more networks 135, and/or the like. Each of the components of the system may be in electronic communication with, for example, one another over the same or different wireless or wired networks including, for example, a wireless cellular network, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Drop Box

In various embodiments, the term drop box 100 is used generically. For example, a drop box 100 may be a mailbox, parcel drop and collection box, drop box for book/video returns, and/or the like. As will be recognized, in many cases, a drop box 100 may have a drop box tray 101 configured to be opened by users to drop items 109 into the drop box 100, and a drop box door 103 for collectors to collect the items 109 from the drop box 100. The drop box tray 101 may have a controlling element for users to operate the drop box tray 101, such as a handle, a button, a knob, a touch panel, and/or the like. Further, each drop box 100 may be associated with a unique drop box identifier (such as a drop box ID) that uniquely identifies the drop box 100. The unique drop box ID may include characters, such as numbers, letters, symbols, and/or the like. For example, an alphanumeric drop box ID (e.g., "AS445") may be associated with each drop box 100. In another embodiment, the unique drop box ID may be a registration number or other identifying information/data assigned to the drop box 100. For example, in one embodiment, the unique drop box ID may contain the GPS location (e.g., latitude and longitude coordinates) of the drop box 100 to spatially identify the drop box.

Figure 2A:
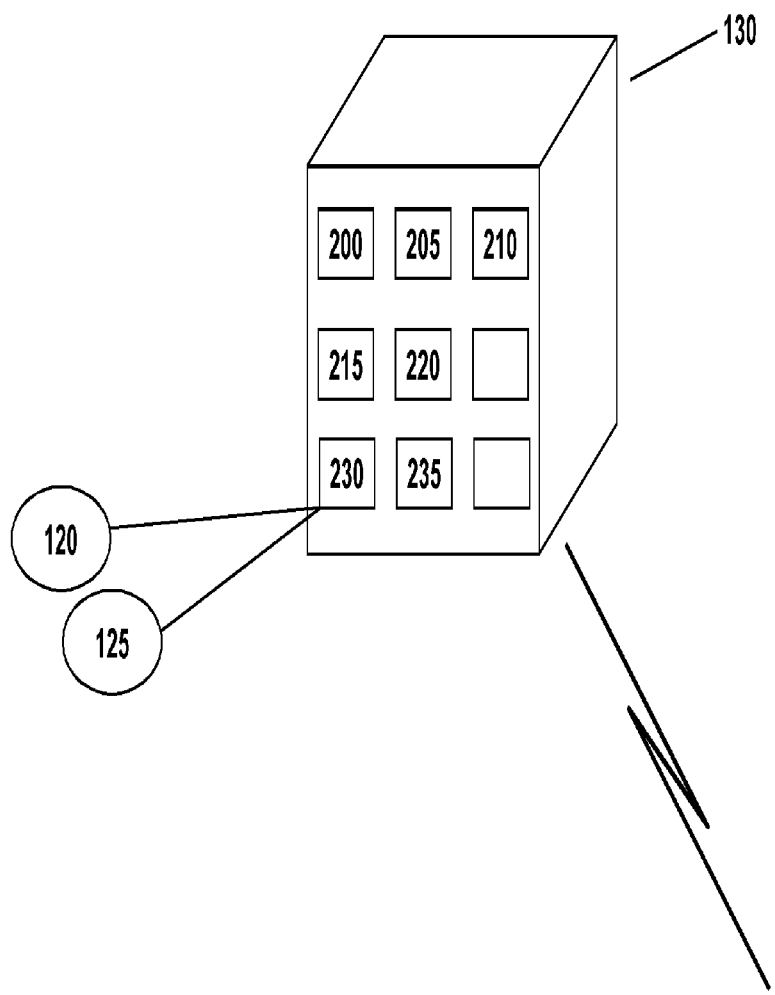
FIG. 2a is a diagram of an IoT computing entity that may be used in association with certain embodiments of the present invention.
Figure 2B:
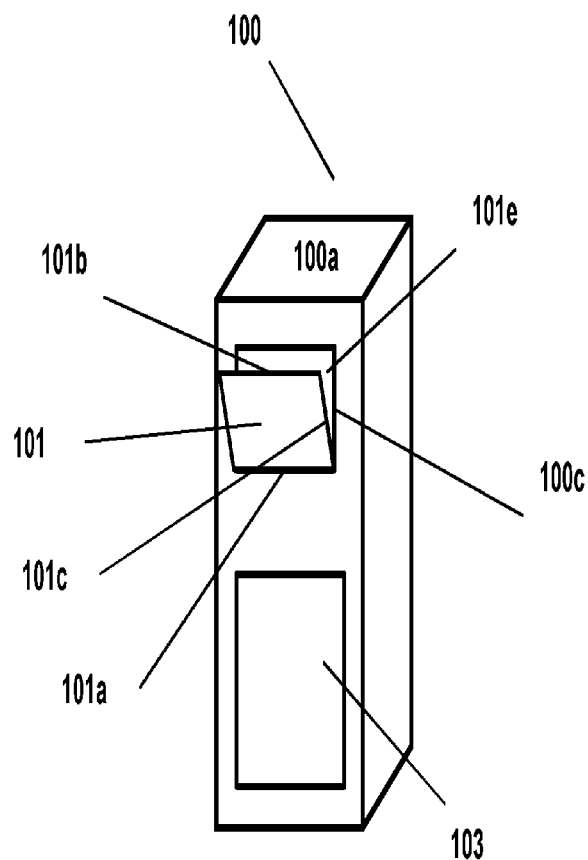
FIG. 2b is a diagram of a drop box with the drop box tray in an open position in accordance with certain embodiments of the present invention.

FIG. 1 shows one or more computing entities, devices, and/or similar words used herein interchangeably that are associated with, integrated in, or affixed to the drop box 100, such as an IoT computing entity 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, watches, glasses, beacons, key fobs, radio frequency identification (RFID) tags, ear pieces, scanners, televisions, dongles, cameras, wristbands, wearable items/devices, items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary IoT computing entity 130 that may be attached, affixed, disposed upon, integrated into, or part of a drop box 100. The IoT computing entity 130 may collect information/data of items 109 in the drop box 100, and transmit/send the information/data to the mobile computing entity 105, the management computing entity 110, and/or various other computing entities via one of several communication methods.

In one embodiment, the IoT computing entity 130 may include, be associated with, or be in wired or wireless communication with one or more processors 200 (various exemplary processors are described in greater detail below), one or more item detection sensors 120, one or more drop box tray position sensors 125, one or more real-time clocks 215, one or more communication ports 230 for receiving information/data from various sensors (e.g., via a I2C bus), one or more communication ports 205 for transmitting/sending data, one or more power sources 220, one or more information/data radios 235 for communication with a variety of communication networks, and one or more memory modules 210. It should be noted that many of these components may be located in the drop box 100 but external to the IoT computing entity 130. Thus, each of the components may be referred to individually or collectively as an IoT computing entity 130.

In one embodiment, the one or more item detection sensors 120, modules, or similar words used herein interchangeably may be one of several components in wired or wireless communication with or available to the IoT computing entity 130. The one or more item detection sensors 120 may include optical sensors such as photoelectric sensors (e.g., light curtain sensors, time-of-flight Infra-Red (IR) sensors, and/or the like), for counting the number of items 109 that have been dropped into the drop box 100 through the drop box tray 101, and/or optical sensors for scanning barcode and/or for capturing dimension of an item 109. In one embodiment, an IR sensor may be positioned or affixed inside the drop box 100 and may be configured as an item detection sensor for counting the number of items dropped into the drop box 100 through the drop box tray 101. For example, an IR time-of-flight sensor with an IR transmitter and an IR receiver may be installed on a second drop box tray edge 101b. The IR transmitter may, while being activated, transmit continuous IR rays/beams towards a direction that the inside surface of the drop box tray 101 is facing. When an item 109 is dropped into the drop box 100 through the drop box tray 101, the IR beam is interrupted by the item 109, which will change intensity of the beam received by the IR receiver module installed at a location close to the IR transmitter and configured to receive the reflected IR rays/beams. As another example, an IR transmitter of the IR sensor may be installed at a location close to a first drop box tray edge 101a, along which the drop box tray 101 may be attached to the drop box via a hinge or other appropriate connections. The IR transmitter may, while being activated, transmit continuous IR rays/beams towards a location on the internal surface of the top facet 100a of the drop box 100. The transmitted IR rays may be received by an IR receiver module of the IR sensor installed at the location on the internal surface of the top facet 100a of the drop box 100, or may be reflected by the internal surface of the top facet 100a of the drop box 100 and may be received by an IR receiver module installed at a location close to the IR transmitter. When an item 109 is dropped into the drop box 100 through the drop box tray 101, the IR beam is interrupted by the item 109, which will either block the beam received by the IR receiver module installed at the location on the internal surface of the top facet 100a of the drop box 100, or change intensity of the beam received by the IR receiver module installed at the location close to the IR transmitter and configured to receive the reflected IR rays/beams. When the beam interruption is detected by the IR sensor, the IoT computing entity 130 may increase the number of items dropped into the drop box 100 by one. As will be recognized, a variety of other configurations of the IR sensor can be used to adapt to various needs and circumstances.

As indicated, in addition to the one or more item detection sensors 120, the IoT computing entity 130 may include and/or be associated with one or more drop box tray position sensors 125, modules, and/or similar words used herein interchangeably. For example, the drop box tray position sensors 125 may include accelerometers, gyroscopes, and/or other sensors for determining if the drop box tray 101 is open or closed, if the drop box tray 101 reaches a configurable position required for the drop box to receive an item 109, and/or the like. In one embodiment, a gyroscope may be affixed to a location close to a second drop box tray edge 101b and be configured as a drop box tray position sensor. For example, when the drop box tray 101 is being opened, the drop box tray 101 may rotate along the first drop box tray edge 101a, and the gyroscope can be used to measure angular velocity of the rotation. The IoT computing entity 130 may be configured to determine a rotation angle 101e of the drop box tray 101 by integrating the measured angular velocity. The rotation angle 101e is collectively defined by a third drop box tray edge 101c and a drop box edge 100c. When the drop box tray 101 is in the closed position, the third drop box tray edge 101c and the drop box edge 100c overlap each other. In an alternative embodiment, an accelerometer may be affixed to a location close to the second drop box tray edge 101b and be configured as a drop box tray position sensor. For example, the accelerometer may be configured to measure the acceleration along the direction in parallel with the third drop box tray edge 101c. When the drop box tray 101 is closed, the third drop box tray edge 101c can be in the vertical direction and the measured acceleration is the gravity acceleration. When the drop box tray 101 is being opened to a configurable angle, the measured acceleration has a smaller value compared with the gravity acceleration. The ratio of the measured acceleration and the gravity acceleration may be used to determine the rotation angle 101e of the drop box tray 101. As another example, similar to how a three-axis accelerometer may be used to measure accelerations and then the measured accelerations may be used to determine yaw, pitch, and roll of an aircraft, the accelerometer may be configured to measure accelerations in three perpendicular directions, and change in accelerations along the three directions can be further used to calculate rotational angles (e.g., pitch and roll) based on trigonometry. The accelerometer may be configured in a way so that one of the calculated rotational angles represents the rotation angle 101e of the drop box tray 101. In one embodiment, the IoT computing entity 130 may determine if a drop box tray 101 is closed or is in one or more configurable open positions to receive an item 109 based at least on the rotation angle of the drop box tray 101. For example, the one or more configurable open positions to receive an item 109 may be preconfigured based on the minimum rotation angle required for the drop box tray 101 to receive an item 109 that is determined based at least on the design of the drop box 100. Alternatively, the one or more configurable positions to receive an item 109 may be determined adaptively by an IoT computing entity 130 by using a set of one or more recorded rotation angles of the drop box tray 101 while items 109 are being dropped into the drop box 100. As will be recognized, a variety of other configurations of accelerometers, gyroscopes, and/or other sensors, and corresponding parameters for determining the drop box tray 101 positions can be used to adapt to various needs and circumstances.

In certain embodiments, a magnetic proximity switch (e.g., a reed switch) may be used to detect if the drop box tray 101 is open or closed. The magnetic proximity switch may be a passive switch that does not draw power from an onboard power source. The magnetic proximity switch may be configured to generate a current interrupt detectable by an onboard controller when the drop box tray 101 is moved between an open and closed position. According to one embodiment, a magnetic switch associated with the drop box tray 101 may be affixed at a position near the top end of the drop box edge 100c and a magnet may be affixed at a position near the top end of the third drop box tray edge 101c. When the drop box tray is in the closed position, the magnetic switch is configured to detect that the drop box tray 101 is closed due to the effect of the magnetic field. When the drop box tray 101 is being opened to a configurable position, the magnet is moved away from the magnet switch and the effect of the magnetic field on the magnetic switch is removed. The magnetic switch is configured to detect that the drop box tray 101 is open such that an onboard controller detects movement of the drop box tray 101 to the open position. Alternatively, as will be recognized, for other types of drop box design and/or configuration of positions of the magnetic switch and the magnet, the magnetic switch may be configured to detect that the drop box tray 101 is open when the magnet is nearby, and to detect that the drop box tray 101 is closed when the magnet is moved away.

Additionally, each IoT computing entity 130 may be powered by one or more power sources 220. The power source may be a source provided by a power outlet, an energy storage device (e.g., a battery, a supercapacitor, and/or the like), an energy harvesting device (e.g., a solar panel, a wind energy harvester, a thermal energy harvester, a RF energy harvester, and/or the like), and/or the like.

In one embodiment, each IoT computing entity 130 can store one or more unique identifiers, such as a global unique identifier (GUID), a universally unique identifier (UUID), a character string, an alphanumeric string, text string, and/or the like. The unique identifier may identify the associated drop box 100 and/or IoT computing entity 130. Via various communication standards and protocols, the IoT computing entity 130 associated with the drop box 100 can be communicated with, interrogated, read, and/or the like. For example, a management computing entity 110 can communicate with the IoT computing entity 130 associated with the drop box 100 using multiple wireless communication standards and protocols, including Bluetooth, Wibree, NFC, Wi-Fi, ZigBee, general packet radio service (GPRS), and/or any other wireless protocol or standard. The IoT computing entity 130 associated with the drop box 100 may also be in direct or indirect communication with the mobile computing entity 105, and/or similar computing entities over the same or different wired or wireless networks.

As will be recognized, an IoT computing entity 130 can be used to sense and/or detect various information/data, and/or control sensor operations. For example, an IoT computing entity 130 can be capable of sensing temperature information/data, acceleration information/data, angle information/data, light information/data, sound information/data, force information/data, shock information/data, image information/data, location information/data, and/or the like. In one embodiment, an IoT computing entity 130 can be capable of turning on and/or turning off item detection sensors 120 after receiving a trigger signal. In another embodiment, an IoT computing entity 130 may be operated in one or more operating modes, such as monitoring mode, sleep mode, and/or the like. In monitoring mode, the IoT computing entity 130 may transmit a signal or signals (both referred to herein in the singular and plural sense) regularly, periodically (e.g., 3 times/hour), continuously, and/or after receiving a trigger signal. The signal may include one or more unique identifiers (e.g., drop box information/data and/or unique IoT computing entity identifier), number of items in the drop box, error message, and/or other information/data. In monitoring mode, the IoT computing entity 130 is also capable of receiving signals transmitted by other computing entities, and executing received instructions. For example, the IoT computing entity 130 may, upon receiving signals from other computing entities, reset its counter, perform self-calibration and/or self-testing, test one or more sensors associated with or in communication with the IoT computing entity 130. In sleep mode, the IoT computing entity 130 may cut power to unneeded subsystems and place the other subsystems (e.g., receiver, processor) into a configurable low power state (e.g., with just sufficient power for the IoT computing entity 130 to detect triggers/events for it to change/switch from sleep mode into other operational modes (e.g., monitoring mode)). The change of the operational mode may be triggered by various configurable triggers/events, such as motion, sound, time, signal transmitted from a mobile computing entity 105 and/or an appropriate computing entity, a switch, a button, combinations thereof, and/or the like.

As indicated, a communication port 230 may be one of several components available in the computing entity 130 (or be in or as a separate computing entity). Embodiments of the communication port 230 may include an Infrared information/data Association (IrDA) communication port, an information/data radio, and/or a serial port. The communication port 230 may receive instructions for the IoT computing entity 130. These instructions may be specific to the drop box 100 in which the computing entity 130 is installed, specific to the state of the drop box 100, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols (including Bluetooth Low Energy (BLE)), wireless universal serial bus (USB) protocols, and/or any other wireless protocol.

b. Exemplary Items

In one embodiment, an item 109 received by a drop box 100 may be any tangible and/or physical object. In one embodiment, an item 109 may be or be enclosed in one or more packages, envelopes, parcels, bags, goods, products, loads, crates, items banded together, drums, the like, and/or similar words used herein interchangeably.

In one embodiment, each item 109 may include and/or be associated with a unique tracking identifier, such as an alphanumeric identifier. Such tracking identifiers may be represented as text, barcodes, tags, character strings, Aztec Codes, MaxiCodes, information/data Matrices, Quick Response (QR) Codes, electronic representations, and/or the like. A unique tracking identifier (e.g., 1Z123456789) may be used by a carrier to identify and track items 109 as they move through a carrier's transportation network. For example, information/data comprising a tracking identifier can be read, scanned, transmitted, and/or the like to provide and/or identify/determine the location of an item 109. Such tracking identifiers can be affixed to items by, for example, using a sticker (e.g., label) with the unique tracking identifier printed thereon (in human and/or machine readable form). Further, such items may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, an item may communicate send "to" address information/data, received "from" address information/data, unique identifier codes, and/or various other information/data. As will be recognized, a variety of other approaches and techniques can be used to adapt to various needs and circumstances.

c. Exemplary Management Computing Entity

Figure 3:
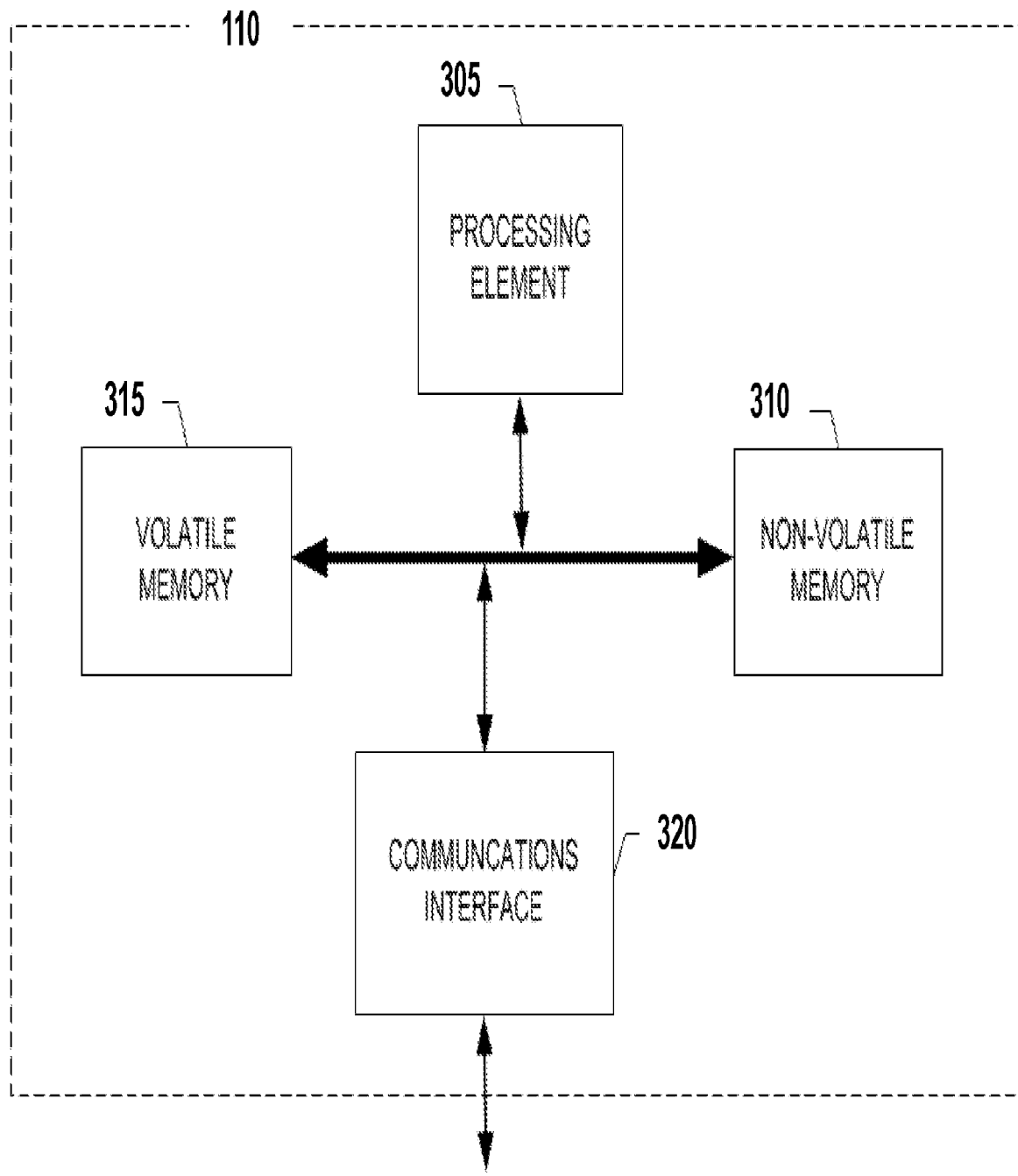
FIG. 3 is a schematic of a management computing entity in accordance with certain embodiments of the present invention.

FIG. 3 provides a schematic of a management computing entity 110 according to one embodiment of the present invention. The management computing entity can be operated by a variety of entities, including a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, beacons, key fobs, RFID tags, ear pieces, scanners, televisions, dongles, cameras, wristbands, wearable items/devices, items/devices, powered assets, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management computing entity 110 may communicate with the IoT computing entity 130, mobile computing entities 105, and/or the like.

As shown in FIG. 3, in one embodiment, the management computing entity 110 may include or be in communication with one or more processing elements 305 (also referred to as processors, processing circuitry, and/or similar terms used herein interchangeably) that communicate with other elements within the management computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the management computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the tracking computing entity 110 with the assistance of the processing element 305 and operating system.

As indicated, in one embodiment, the management computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management computing entity 110 may communicate with IoT computing entities or communication interfaces associated with a drop box 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the management computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the management computing entity 110 may include or be in communication with one or more input elements, such as a keyboard input, a mouse input, a touch screen/display input, audio input, pointing device input, joystick input, keypad input, and/or the like. The management computing entity 110 may also include or be in communication with one or more output elements (not shown), such as audio output, video output, screen/display output, motion output, movement output, and/or the like.

As will be appreciated, one or more of the management computing entity's 110 components may be located remotely from other management computing entity 110 components, such as in a distributed system. Furthermore, one or more of the components may be combined and additional components performing functions described herein may be included in the management computing entity 110. Thus, the management computing entity 110 can be adapted to accommodate a variety of needs and circumstances.

d. Exemplary Mobile Computing Entity

Figure 4:
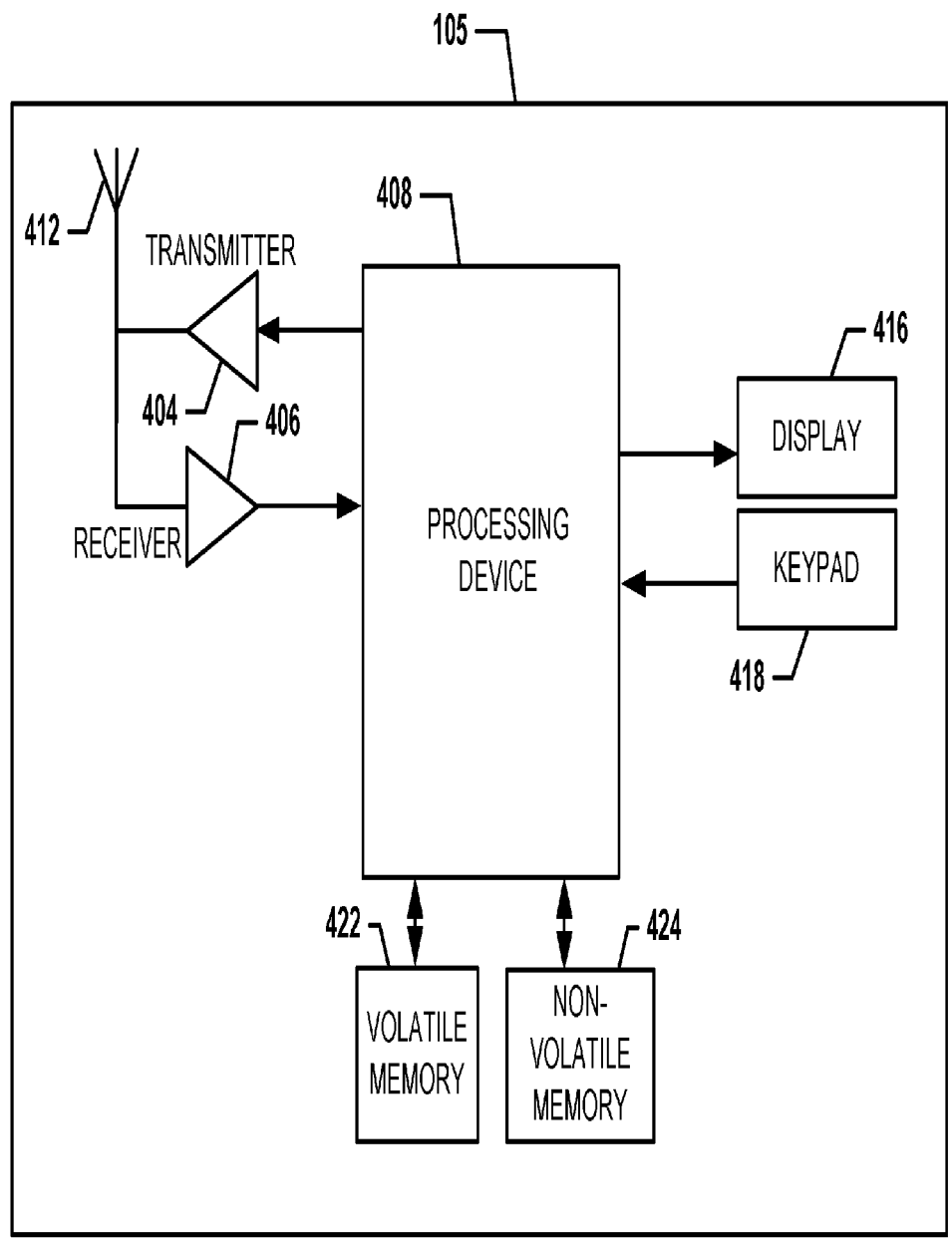
FIG. 4 is a schematic of a mobile computing entity in accordance with certain embodiments of the present invention.

FIG. 4 provides an illustrative schematic representative of a mobile computing entity 105 that can be used in conjunction with embodiments of the present invention. In one embodiment, a mobile computing entity may be carried for use by carrier personnel. In one embodiment, the mobile computing entities 105 may include one or more components that are functionally similar to those of the management computing entity 110 and/or as described below. As will be recognized, mobile computing entities 105 can be operated by various parties, including personnel collecting, delivering, transporting items 109, maintenance personnel, and dispatchers. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as IoT computing entities 130 associated with drop boxes 100, management computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module may be compatible with A-GPS for quick time to first fix and jump starting the ability of the location module to acquire location almanac and ephemeris data, and/or be compatible with SBAS such as WAAS, EGNOS, MSAS, and/or GAGN to increase GPS accuracy. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE receivers and/or transmitters, NFC receivers and/or transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the management data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

d. Exemplary Dispatcher Computing Entity

In one embodiment, the dispatcher computing entities 117 may each include one or more components that are functionally similar to those of the management computing entity 110 and/or the mobile computing entity 105. For example, in one embodiment, each of the dispatcher computing entities 117 may include: (1) a processing element that communicates with other elements via a system interface or bus; (2) a user interface; (3) transitory and non-transitory memory; and (4) a communications interface. As previously noted, the dispatcher computing entities 117 may comprise a user interface. For example, the user interface may be an application, browser, user interface, dashboard, webpage, and/or similar words used herein interchangeably executing on and/or accessible via the dispatcher computing entities 117 to interact with and/or cause display of information/data from the management computing entity 110, the mobile computing entity 105, and/or another appropriate computing entity, as described herein. The user input interface can comprise any of a number of devices allowing the dispatcher computing entities 117 to receive data, such as a keypad (hard or soft), a touch display, voice/speech or motion interfaces, scanners, readers, or other input device. In addition to providing input, the user input interface can be used, for example, to activate or deactivate certain functions, such as screen savers and/or sleep modes. These architectures are provided for exemplary purposes only and are not limiting to the various embodiments.

III. Exemplary System Operation

Figure 5:
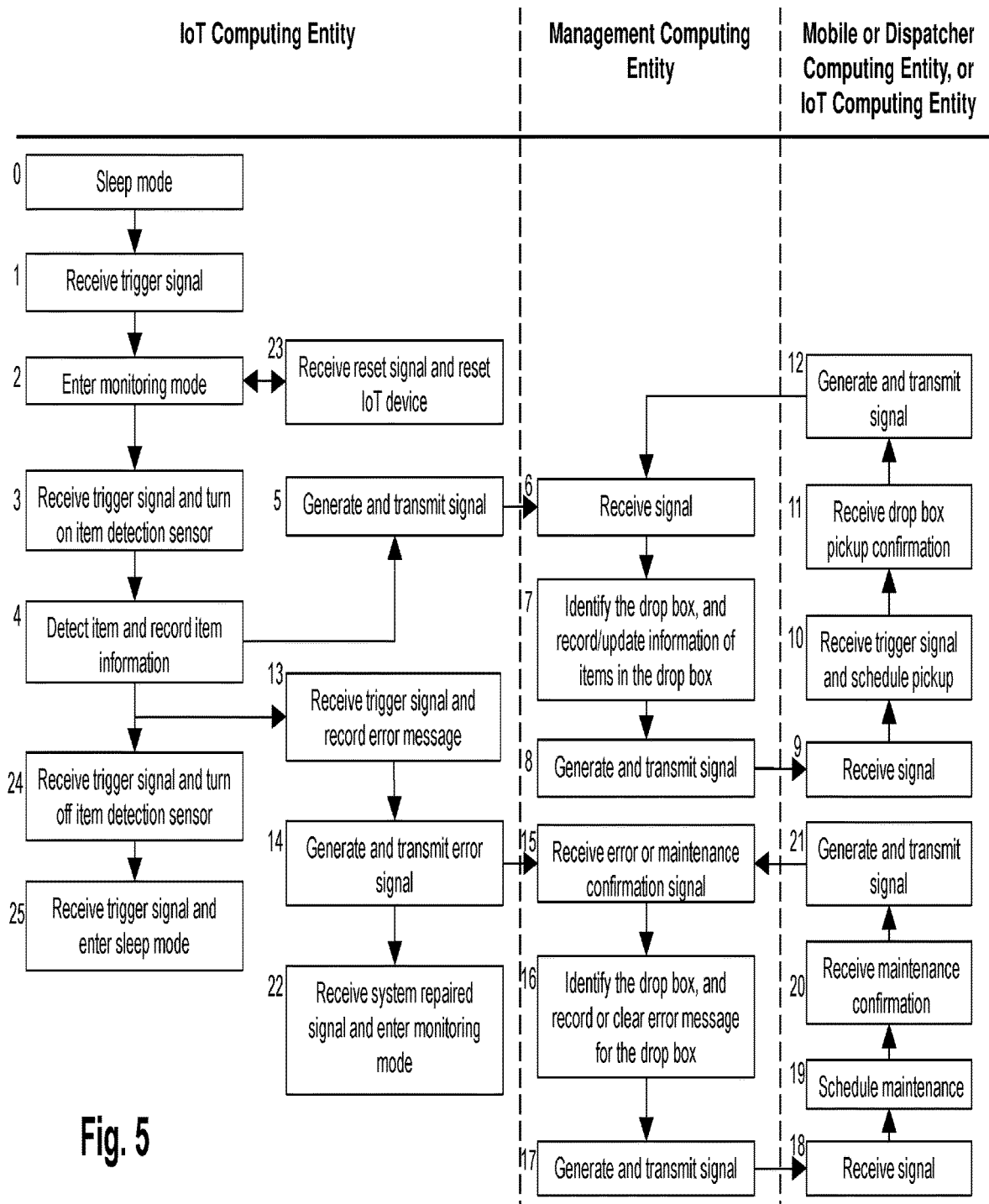
FIG. 5 is a flowchart illustrating operations and processes that can be used in accordance with various embodiments of the present invention.

Reference will now be made to FIG. 5. FIG. 5 is a flowchart illustrating operations and processes that can be used in accordance with various embodiments of the present invention.

a. Brief Overview

In one embodiment, an IoT computing entity 130 associated with a drop box 100 can support enablement of optimization of driver assignments, improvement of collection efficiency and drop box utilization, which includes monitoring items dropped into the drop box 100, and transmitting data/information to a management computing entity 110. Then the management computing entity 110 may transmit information/data to other computing entities in the management system, and achieve the goal of optimizing driver assignments based on the number of items in the drop box 110, and other information/data associated with the items in the drop box 110, if necessary.

The IoT computing entity 130 may be configured to minimize power consumption of the various sensors associated with a drop box 100 by selectively deactivating/activating the sensors in response to one or more trigger events (e.g., the activation of a first sensor may be dependent on signals generated by one or more second sensors). In one embodiment, an IoT computing entity 130 associated with the drop box 100 may receive one or more configurable trigger signals/events and enter the monitoring mode. The one or more configurable trigger signals/events may be from a motion sensor, an optical sensor, a force sensor, a temperature sensor, and/or the like that is associated with or in communication with the IoT computing entity 130. Alternatively, the one or more configurable trigger signals/events may be transmitted from other computing entities, such as the management computing entity 110, mobile computing entities 105, dispatcher computing entities 117, and/or a computing entity associated with an item 109. Further, the IoT computing entity 130 may turn on an item detection sensor 120 upon receiving one or more configurable trigger signals/events. The one or more configurable trigger signals/events may provide an indication that the drop box 100 is in a state of receiving an item 109. The state of the drop box 100 may be determined by determining that the drop box tray 101 reaches one or more configurable positions (e.g., a defined angular position) required for the drop box 100 to receive an item 109. The position of the drop box tray 101 may be determined based on data collected by a drop box tray position sensor 125. The IoT computing entity 130 may then use the item detection sensor 120 to detect the items dropped into the drop box 100 and record the number of the items, and other item information/data (e.g., dimension of each item, barcode associated with each item) if necessary. The IoT computing entity 130 can then transmit signals for use by the management computing entity 110 to enable optimization of driver assignments based on conditions of the drop box 100, such as the number of items in the drop box 100. The signal transmitted by the IoT computing entity 130 may include a unique identifier (e.g., GUID, UUID, and/or the like). Upon receiving signals from the IoT computing entity 130, the management computing entity 110 identifies the drop box 100 and records/updates information/data of items 109 in the drop box 100. The management computing entity 110 may then transmit the information/data of items 109 in the drop box 100 to the mobile computing entities 105, the dispatcher computing entities 117, and/or other appropriate computing entities. Upon detecting that the items 109 in the drop box 100 have reached a configurable condition, a driver may be dispatched to collect the items from the drop box 100, for example, by transmitting a signal to a mobile computing entity 105 carried by the driver that includes instructions to retrieve items from the drop box 100.

In one embodiment, upon receiving one or more configurable trigger signals/events indicating one or more problems associated with the drop box 100 and/or associated IoT computing entity 130, the IoT computing entity 130 may record an error message. The one or more problems may be the result of the drop box tray 101 being blocked by items 109 (e.g., being full), a malfunction of the item detection sensor 120 and/or other components of the IoT computing entity 130 and/or the drop box 100, and/or the like that necessitate collection of items in the drop box 100, and/or maintenance of the drop box 100 (e.g., replacement batteries needed, replacement sensors needed, replacement transmitter needed, and/or the like) and/or the associated IoT computing entity 130. The IoT computing entity 130 may then generate and transmit error signals to the management computing entity 110. The management computing entity 110 identifies the drop box 100 and records an error message for the drop box 100 and may then generate and transmit the error signals for the drop box 100 to the mobile computing entities 105, the dispatcher computing entities 117, and/or other appropriate computing entities.

In one embodiment, upon receiving maintenance confirmation indicating the one or more problems associated with the drop box 100 and the associated IoT computing entity 130 have been fixed, the mobile computing entity 105, the dispatcher computing entity 117, the IoT computing entity 130, and/or another appropriate computing entity may generate and transmit a maintenance confirmation signal for use by the management computing entity 110. The management computing entity 110, upon receiving the maintenance confirmation signal, may identify the drop box 100, clear the error message associated with the drop box 100, and update information/data of items in the drop box 100 if necessary.

In one embodiment, upon receiving a pickup confirmation signal indicating that the items in the drop box 100 have been collected, the mobile computing entity 105, the dispatcher computing entity 117, the IoT computing entity 130, and/or another appropriate computing entity may generate and transmit a signal for use by the management computing entity 110. The signal transmitted by the mobile computing entity 105, the dispatcher computing entity 117, the IoT computing entity 130, and/or another appropriate computing entity may include a unique identifier (e.g., GUID, UUID, and/or the like) of the drop box 100, a pickup confirmation for the drop box 100, and/or other information/data. Upon receiving the signal, the management computing entity 110 identifies the drop box 100 and updates information/data of items in the drop box 100. For example, the management computing entity 110 may reset the number of items in the drop box 100 to be zero. In one embodiment, the management computing entity 110 may further transmit a reset signal to the IoT computing entity 130 associated with the drop box 100.

In one embodiment, upon receiving the reset signal from management computing entity 110, the IoT computing entity 130 associated with the drop box 100 may reset the number of items 109 in the drop box 100 to be 0. In an alternative embodiment, the reset signal may be directly transmitted to the IoT computing entity 130 by the mobile computing entity 105, the dispatcher computing entity 117, or another appropriate computing entity.

In one embodiment, upon receiving one or more configurable trigger signals/events, the IoT computing entity 130 may turn off the item detection sensor 120 to save energy. The one or more configurable trigger signals/events may be a configurable period of time during which the drop box tray 101 is in a closed position or one or more configurable positions. Alternatively, the one or more configurable trigger signals/events may be a configurable period of time during which the drop box tray 101 is in the same position and no items are dropped into the drop box 100. As another alternative, the one or more configurable trigger signals/events may be no people being detected within a configurable distance from the drop box 100 for a configurable period of time.

In one embodiment, upon receiving one or more configurable trigger signals/events, the IoT computing entity 130 may enter the sleep mode for additional energy saving. The one or more configurable trigger signals/events may be a configurable period of time during which the drop box tray 101 is in a closed position or one or more configurable positions, no people being detected within a configurable distance from the drop box 100 for a configurable period of time, and/or signals transmitted from the management computing entity 110, the mobile computing entities 105, and/or the dispatcher computing entities 117. As will be recognized, a variety of approaches and techniques can be used to adapt to various needs and circumstances.

b. Operations

Operations/Steps 0, 1 and 2 of FIG. 5: Receive Trigger Signal, and Enter Monitoring Mode from Sleep Mode In one embodiment, the process may begin with an IoT computing entity 130 associated with a drop box 100 receiving one or more configurable trigger signals/events that enable the IoT computing entity 130 to switch to monitoring mode from sleep mode. The one or more trigger signals/events may be from a magnetic proximity switch, a motion sensor, an optical sensor, a force sensor, a temperature sensor, a timer, and/or the like. For example, when a user places an item 109 into the drop box 100, the user will first approach the drop box 100 and open a drop box tray 101 to a position that enables the drop box 100 to receive the item 109 by operating the controlling element (such as a handle) of the drop box tray 101. The one or more configurable trigger signals/events may be change of a magnetic field detected by the magnetic proximity switch associated with the drop box tray 101, motion of the drop box tray 101 (e.g., measured by accelerometers, gyroscopes, and/or the like), the controlling element of the drop box tray 101 being operated by a user (e.g., detected by force sensors, temperature sensors, and/or the like), a configurable period of time, and/or presence of at least one user detected near or within a configurable distance from the drop box 100 (e.g., detected by image sensors, infrared sensors, and/or the like). The configurable trigger signals/events may be preconfigured, determined adaptively by the IoT computing entity 130 associated with the drop box 100, and/or the like. As an alternative, the one or more configurable trigger signals/events may be transmitted from other computing entities, such as a management computing entity 110, a mobile computing entity 105, a dispatcher computing entity 117, and/or a computing entity associated with an item 109. In one embodiment, the IoT computing entity 130 associated with the drop box 100 may have a preconfigured interest in signals transmitted by a particular class/type of management computing entity 110, mobile computing entity 105, a dispatcher computing entity 117, and/or other appropriate computing entity. The signals may include one or more unique identifiers that uniquely identify the corresponding management computing entity 110, mobile computing entity 105, dispatcher computing entity 117, and/or other appropriate computing entity. Using this approach, the IoT computing entity 130 can ignore all other computing entity signals to which it is not configured to respond. Similarly, the IoT computing entity 130 can respond to signals generated by a number of different types of management computing entity 110, mobile computing entity 105, dispatcher computing entity 117, and/or other appropriate computing entity.

As an alternative, the process may begin with an IoT computing entity 130 associated with a drop box 100 being in the monitoring mode and entering the sleep mode upon detecting one or more trigger signals/events. For instance, the IoT computing entity 130 may enter the sleep mode when the drop box 100 has not been used (e.g., the drop box tray 101 has not been opened) by any users for a configurable time period. The one or more configurable trigger signals/events may be from a motion sensor, an optical sensor, a force sensor, a timer, a computing entity, and/or the like. For example, the one or more configurable trigger signals/events may be a configurable period of time for the drop box tray 101 of the drop box 100 maintaining one or more configurable positions for a configurable period of time (e.g., measured by accelerometers, gyroscopes, and/or the like), a configurable period of time elapsing without the item detection sensor 120 detecting any items 109 being dropped into the drop box 100 by the item detection sensor 120, a configurable period of time without detecting a force exceeding a configurable value applied to the controlling element of the drop box tray 101 (e.g., detected by force sensors, and/or the like), a request from other appropriate computing entity, and/or a configurable period of time. The one or more configurable trigger signals/events may be preconfigured, determined adaptively by the IoT computing entity 130, transmitted from other computing entity, and/or the like. Upon receiving the one or more configurable trigger signals/events that enable the IoT computing entity 130 to enter the monitoring mode from the sleep mode, the IoT computing entity 130 may enter the monitoring mode again.

As another alternative, an IoT computing entity 130 may stay in the monitoring mode continuously, or enter the monitoring mode regularly, periodically, during certain time periods or time frames, on certain days, in response to requests, in response to determinations/identifications, combinations thereof, and/or the like. As will be recognized, a variety of other approaches and technique can be used to adapt to various needs and circumstances.

Operation/Step 3 of FIG. 5: Receive Trigger Signal and Turn on Item Detection Sensor In one embodiment, upon receiving one or more configurable trigger signals, the IoT computing entity 130 may turn on/activate associated item detection sensor 120. The one or more configurable trigger signals/events may be from a motion sensor, an optical sensor, a force sensor, a timer, a computing entity, and/or the like. For example, the one or more configurable trigger signals/events may be one or more configurable positions of a drop box tray 101 associated with a drop box 100 (e.g., measured by accelerometers, gyroscopes, and/or the like), force applied to the controlling element of the drop box tray 101 (e.g., detected by force sensors, and/or the like) exceeding a configurable value, and/or a configurable period of time. The one or more configurable trigger signals/events may be preconfigured, determined adaptively by the IoT computing entity 130 associated with the drop box 100, transmitted from another appropriate computing entity, and/or the like. In one embodiment, the drop box tray 101 has to be opened by a user to reach a configurable rotation angle in order to receive an item 109. Then, the configurable rotation angle may be used as a trigger signal/event for activating the item detection sensor 120. For example, when the user operates the controlling element of the drop box tray 101, the IoT computing entity 130 determines the rotation angle of the drop box tray 101 using the data measured by an accelerometer and/or a gyroscope. When the rotation angle of the drop box tray 101 reaches the configurable rotation angle for receiving an item, the IoT computing entity 130 can activate the item detection sensor 120.

As an alternative, an item detection sensor 120 may be activated using other mechanisms, such as using magnetic switch. According to one embodiment, a magnetic switch associated with the item detection sensor 120 may be affixed at a position near the top end of the drop box edge 100c and a magnet may be affixed at a position near the top end of the third drop box tray edge 101c. When the drop box tray is in the closed position, the magnetic switch is configured to deactivate the item detection sensor 120 due to the effect of the magnetic field. When the drop box tray 101 is being opened to a configurable position, the magnet is moved away from the magnetic switch and the effect of the magnetic field on the magnetic switch is removed. The magnetic switch is configured to activate the item detection sensor 120. Alternatively, as will be recognized, for other types of drop box design and/or configuration of positions of the magnetic switch and the magnet, the magnetic switch may be configured to activate the item detection sensor 120 when the magnet is nearby, and deactivate the item detection sensor 120 when the magnet is moved away. As another alternative, an item detection sensor 120 may be activated continuously, regularly, periodically, during certain time periods or time frames, on certain days, in response to requests, in response to determinations/identifications, combinations thereof, and/or the like. As will be recognized, a variety of other approaches and technique can be used to adapt to various needs and circumstances.

Operation/Step 4 of FIG. 5: Detect Item and Record Item Information

In one embodiment, upon detecting an item 109 being dropped into a drop box 100 via an item detection sensor 120, an IoT computing entity 130 associated with the drop box 100 may record information/data associated with the detected item. The item detection sensor 120 may be a photoelectric sensor, such as an infrared (IR) sensor, an optical sensor, and/or the like. The item information/data recorded by the IoT computing entity 130 may be the number of items dropped into the drop box 100, dimension of one or more items, weight of one or more items, barcode of one or more items, and/or the like.

In one embodiment, the item detection sensor 120 may be an IR sensor that can detect the number of items dropped into the drop box 100. For example, as previously noted, when an item 109 is placed, inserted, dropped, and similar words used herein interchangeably into the drop box 100 through the drop box tray 101, it will either temporarily block the beam received by the IR receiver module or change intensity of the beam received by the IR receiver module of the IR sensor, depending on the configuration of the IR transmitter and receiver. Therefore, the number of items dropped into the drop box 100 can be determined based on the number of times that the beam of the IR sensor is interrupted. The item information/data recorded by the IoT computing entity 130 may be the number of items dropped into the drop box 100 since the last pickup/collection, the total number of items dropped into the drop box 100 hourly, daily, or during a specified period of time, peak hours for item dropping at the drop box 100, and/or the like.

In an alternative embodiment, the item detection sensor 120 may be a barcode reader that can read the barcode of each item while being dropped into the drop box 100. The item information/data recorded by the IoT computing entity 130 may be the barcode associated with each item in the drop box 100, the number of items dropped into the drop box 100 since the last pickup/collection, the total number of items dropped into the drop box 100 hourly, daily, or during a specified period of time, peak hours for item dropping at the drop box 100, and/or the like.

In another alternative embodiment, the item detection sensor 120 may be an optical sensor that can measure the dimension of each item while being dropped into the drop box 100. The item information/data recorded by the IoT computing entity 130 may be the dimension of each item in the drop box 100, the number of items dropped into the drop box 100 since the last pickup/collection, the total number of items dropped into the drop box 100 hourly, daily, or during a specified period of time, peak hours for item dropping at the drop box 100, and/or the like.

Operation/Step 5 of FIG. 5: Generate and Transmit Signal

In one embodiment, the IoT computing entity 130 may transmit a signal for use by a management computing entity 110. The IoT computing entity 130 may transmit the signal regularly, periodically, continuously, during certain time periods or time frames, on certain days, upon determining the occurrence of one or more configurable triggers/events, in response to requests, in response to determinations/identifications, combinations thereof, and/or the like. The signal from the IoT computing entity 130 may include the drop box's unique identifier, the IoT computing entity's unique identifier, item information/data associated with the drop box 100, and/or other information/data. As an alternative embodiment, the IoT computing entity 130 may also transmit the signal to mobile computing entities 105, dispatcher computing entities 117, and/or other appropriate computing entities. The communication between the IoT computing entity 130 and the appropriate computing entity may be executed using a wired connection, for example, a bus, a wired PAN, or the like, or via wireless communication networks, for example, a wireless PAN, LAN, MAN, WAN, or the like.

Operations/Steps 6, 7, and 8 of FIG. 5: Receive Signal, Record/Update Drop Box Information, Generate and Transmit Signal In one embodiment, upon receiving the signal from the IoT computing entity 130 associated with the drop box 100, the management computing entity 110 may identify the drop box 100 and record/update the drop box information. The recorded/updated drop box information may be the number of items dropped into the drop box 100 since the last pickup/collection and/or since the last drop box information update, the barcode associated with each item in the drop box 100, the time when each item was dropped into the drop box, the total number of items dropped into the drop box 100 hourly, daily, or during a specified period of time, peak hours for item dropping at the drop box 100, and/or the like. The recorded drop box information/data may be further used by the management computing entity 110 to determine pickup schedule for the drop box 100.

In one embodiment, the management computing entity 110 may transmit a signal for use by a mobile computing entity 105, a dispatcher computing entity 117, the IoT computing entity 130, and/or another appropriate computing entity. The management computing entity 110 may transmit the signal regularly, periodically, continuously, during certain time periods or time frames, on certain days, upon determining the occurrence of one or more configurable triggers/events, in response to requests, in response to determinations/identifications, combinations thereof, and/or the like. The signal from the management computing entity 110 may include unique identifiers of a drop box 100 and/or associated IoT computing entity 130, item information/data associated with the drop box 100, pickup schedule for the drop box, and/or other information/data. The communication between the management computing entity 110 and the appropriate computing entity may be executed using a wired connection, for example, a bus, a wired PAN, or the like, or via wireless communication networks, for example, a wireless PAN, LAN, MAN, WAN, or the like.

Operations/Steps 9, 10, 11, and 12 of FIG. 5: Schedule Drop Box Pickup, Receive Pickup Confirmation, and Generate and Transmit Signal In one embodiment, after receiving the item information/data in the drop box 100, the mobile computing entity 105 or the dispatcher computing entity 117 may schedule a pick up for the drop box 100 upon determining the occurrence of one or more configurable triggers/events. The one or more configurable triggers/events may be the number of items in the drop box exceeding a configurable value, at least one item in the drop box before a prescheduled pickup time, a signal received from the management computing entity 110 or other appropriate computing entities, and/or the like.

In one embodiment, upon detecting another one or more configurable triggers/events, the management computing entity 110, the mobile computing entity 105, or the dispatcher computing entity 117 may cancel a prescheduled pickup. The other configurable triggers/events may be no items in the drop box 110, the number of items in the drop box is below a configurable value at a time that is a configurable time away from the next prescheduled pickup time, the volume of items in the drop box is below a configurable value at a time that is a configurable time away from the next prescheduled pickup time, and/or the like.

In one embodiment, upon receiving a pickup confirmation for the drop box 100, the mobile computing entity 105, the dispatcher computing entity 117, or the IoT computing entity 130 may transmit a signal for use by the management computing entity 110. The signal may include the drop box's unique identifier, a pickup information/data for the drop box 100, and/or other information/data. The pickup confirmation for the drop box 100 may be received as an input from a pickup driver, a signal from the door of the drop box 100 indicating both an open and a closed operation within a configurable period of time, a signal from a sensor (such as a weight sensor) associated with the drop box 100, and/or the like. The pickup confirmation may be initially received by the mobile computing entity 105, the dispatcher computing entity 117, and/or the IoT computing entity 130, and further transmitted to other appropriate computing entities.

In one embodiment, upon receiving the pickup confirmation for the drop box 100, the management computing entity 110 may reset the number of items in the drop box to be 0. The management computing entity 110 may further generate and transmit a reset signal for use by the IoT computing entity 130 associated with the drop box 100.

Operations/Steps 13 and 14 of FIG. 5: Receive Trigger Signal, Record Error Message, and Generate and Transmit Error Signal In one embodiment, upon receiving one or more configurable trigger signals, the IoT computing entity 130 associated with the drop box 100 may record an error message. The one or more configurable trigger signals/events may be from a sensor and/or a computing entity associated with the IoT computing entity 130 and/or the drop box 100. For example, the one or more configurable trigger signals/events may be the beam of an IR item detection sensor being blocked for a configurable period of time, detection of malfunction of one or more sensors (e.g., an item detection sensor, and/or a motion sensor) associated with the IoT computing entity 130 and/or the drop box 100, one or more configurable abnormal positions of the drop box 100, a configurable energy level associated with the IoT computing entity 130, and/or the like. The IoT computing entity 130 may further generate and transmit an error signal for use by the management computing entity 110. The error signal from the IoT computing entity 130 may include the drop box's unique identifier, the IoT computing entity's unique identifier, error message associated with the IoT computing entity 130 and/or the drop box 100, and/or other information/data. As an alternative embodiment, the IoT computing entity 130 may also transmit the error signal to mobile computing entities 105, dispatcher computing entities 117, and/or other appropriate computing entities.

Operations/Steps 15, 16, and 17 of FIG. 5: Receive Error Signal, Identify Drop Box, Record Error Message, and Generate and Transmit Signal In one embodiment, upon receiving the error signal from the IoT computing entity 130 associated with the drop box 100, the management computing entity 110 may identify the drop box 100 and record the error message for the drop box.

In an alternative embodiment, the management computing entity 110 may record an error message for the IoT computing entity 130 associated with the drop box 100 upon detecting the occurrence of one or more configurable trigger events. The one or more configurable trigger events may be a configurable period of time without receiving any signal from the IoT computing entity 130, a configurable number of requests from the management computing entity 110 to the IoT computing entity 130 without any responses, and/or the like.

In one embodiment, the management computing entity 110 may transmit an error signal for use by a mobile computing entity 105, a dispatcher computing entity 117, and/or the IoT computing entity 130. The management computing entity 110 may transmit the error signal regularly, periodically, continuously, during certain time periods or time frames, on certain days, upon determining the occurrence of one or more configurable triggers/events, in response to requests, in response to determinations/identifications, combinations thereof, and/or the like. The error signal from the management computing entity 110 may include unique identifiers of the drop box 100 and/or associated IoT computing entity 130, error message associated with the drop box 100 and/or associated IoT computing entity 130, maintenance schedule for the drop box and/or associated IoT computing entity 130, and/or other information/data.

Operations/Steps 18, 19, 20, and 21 of FIG. 5: Receive Signal, Schedule Maintenance, Receive Maintenance Confirmation, and Generate and Transmit Signal In one embodiment, after receiving the error signal associated with the drop box 100 and/or the associated IoT computing entity 130, the mobile computing entity 105, or the dispatcher computing entity 117 may schedule appropriate maintenance for the drop box 100 and/or associated IoT computing entity 130, and/or transmit a maintenance schedule signal to appropriate computing entities associated with a maintenance personnel and/or a pickup driver.

In one embodiment, upon receiving a maintenance confirmation for the drop box 100, the mobile computing entity 105, the dispatcher computing entity 117, the IoT computing entity 130, and/or the appropriate computing entity may transmit a signal for use by the management computing entity 110. The signal may include the drop box's unique identifier, the IoT computing entity's unique identifier, maintenance confirmation information/data for the drop box 100, and/or other information/data. The maintenance confirmation for the drop box 100 may be received as an input from a pickup driver and/or a maintenance personnel, a signal from the IoT computing entity 130 after receiving a signal from a reset button and/or after confirming normal operation via running a configurable self-testing procedure, a signal from a sensor (such as a position sensor) associated with the drop box 100, and/or the like. The maintenance confirmation may be initially received by the mobile computing entity 105, the dispatcher computing entity 117, the IoT computing entity 130, and/or the appropriate computing entity, and further transmitted to other appropriate computing entities.

In one embodiment, the items in the drop box 100 may be collected during maintenance. Upon receiving a pickup confirmation for the drop box 100, the mobile computing entity 105, the dispatcher computing entity 117, the IoT computing entity 130, and/or the appropriate computing entity may transmit a signal for use by the management computing entity 110 and other appropriate computing entities. The signal may include the drop box's unique identifier, a pickup information/data for the drop box 100, and/or other information/data. The pickup confirmation for the drop box 100 may be received as an input from a pickup driver or a maintenance personnel, a signal from a sensor (such as a weight sensor) associated with the drop box 100, and/or the like. The pickup confirmation may be initially received by the mobile computing entity 105, the dispatcher computing entity 117, the IoT computing entity 130, and/or the appropriate computing entity, and further transmitted to other appropriate computing entities.

In one embodiment, upon receiving the pickup confirmation for the drop box 100, the management computing entity 110 may reset the number of items in the drop box to be 0. The management computing entity 110 may further transmit a reset signal for use by the IoT computing entity 130 associated with the drop box 100, and/or other appropriate computing entities.

Operations/Steps 15, 16, and 17 of FIG. 5: Receive Maintenance Confirmation Signal, Identify Drop Box, Clear Error Message, and Generate and Transmit Signal In one embodiment, upon receiving the maintenance confirmation signal for the drop box 100, the management computing entity 110 may identify the drop box and clear the error message for the drop box 100. The management computing entity 110 may further transmit a system repaired signal for use by the IoT computing entity 130 associated with the drop box 100, and/or other appropriate computing entities.

Operation/Step 22 of FIG. 5: Receive System Repaired Signal, and Enter Monitoring Mode In one embodiment, upon receiving a system repaired signal for the drop box 100, the IoT computing entity 130 associated with the drop box 100 may enter normal monitoring mode. The system repaired signal may be transmitted by the management computing entity 110, a mobile computing entity 105, a dispatcher computing entity 117, and/or an appropriate computing entity. As an alternative, the system repaired signal may be generated by the IoT computing entity 130 associated with the drop box 100 after receiving a signal from a reset button and/or after confirming normal operation via running a configurable self-testing procedure. The signal from a reset button may be generated by a pickup driver or a maintenance personnel via a manual approach, by enabling the IoT computing entity 130 to automatically control the reset button upon detecting one or more configurable trigger signals/events (such as unblocking of the beam of the IR sensor), and/or the like.

Operation/Step 23 of FIG. 5: Receive Reset Signal, and Reset IoT Entity

In one embodiment, upon receiving the reset signal from a management computing entity 110 of a particular class/type (e.g., an appropriate computing entity for which the IoT computing entity 130 has a preconfigured interest), the IoT computing entity 130 associated with the drop box 100 may reset the number of items in the drop box 100 to be 0. As an alternative, the reset signal may be transmitted by a mobile computing entity 105, a dispatcher computing entity 117, and/or another appropriate computing entity. The reset signal may be generated upon receiving pickup conformation during normal operation and/or after maintenance of the drop box 100.

Operation/Step 24 of FIG. 5: Receive Trigger Signal, and Turn Off Item Detection Sensor In one embodiment, upon receiving one or more configurable trigger signals, the IoT computing entity 130 associated with the drop box 100 may turn off/deactivate the item detection sensor 120. For example, if no items have been dropped into the drop box for a configurable time period and/or if the drop box tray 101 has been at a closed position for a configurable time period, the item detection sensor 120 may be deactivated. The one or more configurable trigger signals/events may be from a motion sensor, an optical sensor, a force sensor, a timer, a computing entity, and/or the like. For example, the one or more configurable trigger signals/events may be a configurable period of time for the drop box tray 101 of the drop box 100 maintaining at one or more configurable positions (e.g., measured by accelerometers, gyroscopes, and/or the like), a configurable period of time without detecting any items dropped into the drop box 100 by the item detection sensor 120, a configurable period of time without detecting a force exceeding a configurable value applied to the controlling element of the drop box tray 101 (e.g., detected by force sensors, and/or the like), a request from another appropriate computing entity, and/or a configurable period of time. The configurable trigger signals/events may be preconfigured, determined adaptively by the IoT computing entity 130 associated with the drop box 100, transmitted from another computing entity, and/or the like.

As an alternative, an item detection sensor 120 may be deactivated using other mechanisms, such as using magnetic switch. According to one embodiment, a magnetic switch associated with the item detection sensor 120 may be affixed at a position near the top end of the drop box edge 100c, and a magnet may be affixed at a position near the top end of the third drop box tray edge 101c. When the drop box tray 101 is in the closed position, the magnetic switch is configured to deactivate the item detection sensor 120 due to the effect of the magnetic field. When the drop box tray 101 is being opened to a configurable position, the magnet is moved away from the magnet switch and the effect of the magnetic field on the magnetic switch is removed. The magnetic switch is configured to activate the item detection sensor 120. Alternatively, as will be recognized, for other types of drop box designs and/or configurations of positions of the magnetic switch and the magnet, the magnetic switch may be configured to activate the item detection sensor 120 when the magnet is nearby and deactivate the item detection sensor 120 when the magnet is moved away. As another alternative, an item detection sensor 120 may be deactivated regularly, periodically, during certain time periods or time frames, on certain days, in response to requests, in response to determinations/identifications, combinations thereof, and/or the like. As will be recognized, a variety of other approaches and technique can be used to adapt to various needs and circumstances.

Operation/Step 25 of FIG. 5: Receive Trigger Signal, and Enter Sleep Mode In one embodiment, upon receiving one or more configurable trigger signals/events, the IoT computing entity 130 associated with the drop box 100 may enter the sleep mode. For instance, the IoT computing entity 130 may enter the sleep mode when the drop box 100 has not been used by any users for a configurable time period. The one or more configurable trigger signals/events may be from a motion sensor, an optical sensor, a force sensor, a temperature sensor, a timer, a computing entity, and/or the like. For example, the one or more configurable trigger signals/events may be a configurable period of time for the drop box tray 101 of the drop box 100 maintaining at one or more configurable positions (such as a closed position), a configurable period of time without detecting any items dropped into the drop box 100, a configurable period of time without detecting a force exceeding a configurable value applied to the controlling element of the drop box tray 101 (e.g., detected by force sensors, and/or the like), a configurable period of time, and/or no user being detected near or within a configurable distance from the drop box 100 (e.g., detected by image sensors, infrared sensors, and/or the like). The configurable trigger signals/events may be preconfigured, determined adaptively by the IoT computing entity 130 associated with the drop box 100, and/or the like. As an alternative, the one or more configurable trigger signals/events may be transmitted from another computing entity, such as a management computing entity 110, a mobile computing entity 105, a dispatcher computing entity 117, and/or another appropriate computing entity.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. An item drop box comprising:
    a housing configured to receive one or more items via a movable deposit tray;
    at least one sensor configured to detect movement of the movable deposit tray;
    an item detection sensor configured to detect items deposited in the housing;
    a controller configured to:
        detect signals generated by the at least one sensor,
        upon detecting movement of the movable deposit tray, activate the item detection sensor, generate status data for the item drop box, and
        transmit the status data to one or more external computing entities.

2. The item drop box of claim 1, wherein the at least one sensor comprises a proximity sensor configured to determine whether the movable deposit tray is in a closed position or an open position, or an accelerometer configured to detect an angle of rotation of the movable deposit tray.

3. The item drop box of claim 2, wherein the controller is further configured to:
    detect signals generated by the proximity sensor,
    wherein upon detecting that the movable deposit tray has moved from the closed position to the open position, activate the accelerometer to detect the angle of rotation of the movable deposit tray, and
    upon detecting that the movable deposit tray has moved to a trigger angular position, activate the item detection sensor.

4. The item drop box of claim 1, wherein the item detection sensor comprises a time-of-flight sensor.

5. The item drop box of claim 1, wherein the controller activates the item detection sensor for a predefined period of time.

6. The item drop box of claim 1, wherein the status data identifies whether an item is present within the housing.

7. The item drop box of claim 1, wherein the controller comprises at least one non-transitory memory storage medium, one or more processors, and one or more wireless transmitters.

8. An item drop box comprising:
    a housing for receiving one or more items via a movable deposit tray;
    at least one sensor for detecting movement of the movable deposit tray;
    an item detection sensor for detecting items deposited in the housing;
    a controller communicatively coupled with the at least one sensor and the item detection sensor, wherein upon detecting movement of the movable deposit tray the controller activates the item detection sensor and generates status data for the item drop box, and transmit the status data to one or more external computing entities.

9. The item drop box of claim 8, wherein the at least one sensor comprises a proximity sensor configured to determine whether the movable deposit tray is in a closed position or an open position, or an accelerometer configured to detect an angle of rotation of the movable deposit tray.

10. The item drop box of claim 9, wherein in response to a signal generated by the proximity sensor the controller activates the accelerometer.

11. The item drop box of claim 10, wherein in response to the accelerometer detecting that the movable deposit tray has moved to a trigger angular position the controller activates the item detection sensor.

12. The item drop box of claim 8, wherein the controller activates the item detection sensor for a predefined period of time.

13. The item drop box of claim 8, wherein the status data comprises at least one of:
    a number of times items were deposited into the item drop box;
    a power supply level;
    an operational status; or
    a wireless transmitter status of the controller.

14. The item drop box of claim 8, wherein the one or more external computing entities comprise a central server communicatively coupled with a plurality of item drop boxes.

15. A drop box network monitoring system comprising a central server communicatively coupled with a plurality of item drop boxes, wherein each item drop box of the plurality of item drop boxes comprises:
    a housing for receiving one or more items via a movable deposit tray;
    at least one sensor for detecting movement of the movable deposit tray;
    an item detection sensor for detecting items deposited in the housing;
    a controller communicatively coupled with the at least one sensor and the item detection sensor, wherein upon detecting movement of the movable deposit tray the controller activates the item detection sensor and generates status data for the item drop box, and transmit the status data to the central server.

16. The drop box network monitoring system of claim 15, in response to a signal generated by the at least one sensor for detecting movement activates the item detection sensor.

17. The drop box network monitoring system of claim 15, wherein the central server is further configured to transmit one or more alerts to one or more mobile computing entities.

18. The drop box network monitoring system of claim 15, wherein the status data identifies at least one of:
    a number of times items were deposited into a particular item drop box;
    a power supply level for the particular item drop box;
    an operational status of the particular item drop box; or
    a wireless transmitter status of the controller of the particular item drop box.

19. The drop box network monitoring system of claim 15, wherein the at least one sensor comprises a proximity sensor configured to determine whether the movable deposit tray is in a closed position or an open position, or an accelerometer configured to detect an angle of rotation of the movable deposit tray.

20. The drop box network monitoring system of claim 15, wherein the item detection sensor comprises a time-of-flight sensor.

\* \* \* \* \*